United States Patent
Utsumi et al.

(10) Patent No.: US 8,488,089 B2
(45) Date of Patent: Jul. 16, 2013

(54) LIQUID CRYSTAL PANEL AND LIQUID CRYSTAL DISPLAY DEVICE

(75) Inventors: Yuka Utsumi, Hitachi (JP); Ikuo Hiyama, Hitachinaka (JP)

(73) Assignees: Hitachi Displays, Ltd., Chiba (JP); Panasonic Liquid Crystal Display Co., Ltd, Hyogo (JP)

( * ) Notice: Subject to any disclaimer, the term of this patent is extended or adjusted under 35 U.S.C. 154(b) by 251 days.

(21) Appl. No.: 13/102,146

(22) Filed: May 6, 2011

(65) Prior Publication Data

US 2011/0273637 A1   Nov. 10, 2011

(30) Foreign Application Priority Data

May 7, 2010   (JP) .................................. 2010-107088

(51) Int. Cl.
*G02F 1/1335* (2006.01)
(52) U.S. Cl.
USPC ........................................................ 349/117
(58) Field of Classification Search
None
See application file for complete search history.

(56) References Cited

U.S. PATENT DOCUMENTS

| | | |
|---|---|---|
| 2003/0169391 A1 | 9/2003 | Uchida et al. |
| 2006/0060821 A1 | 3/2006 | Fujisawa et al. |
| 2010/0321607 A1* | 12/2010 | Utsumi et al. ................. 349/61 |
| 2011/0234952 A1* | 9/2011 | Shi ................................ 349/117 |
| 2011/0242462 A1* | 10/2011 | Hirakata et al. ............... 349/99 |

FOREIGN PATENT DOCUMENTS

| | | |
|---|---|---|
| JP | 2000-091734 | 3/2000 |
| JP | 2000-137116 | 5/2000 |
| JP | 2001-235622 | 8/2001 |
| JP | 3526830 | 2/2004 |
| JP | 2004-163452 | 6/2004 |
| JP | 3863446 | 10/2006 |
| JP | 2008-107766 | 5/2008 |

* cited by examiner

*Primary Examiner* — Sung Pak

(74) *Attorney, Agent, or Firm* — Antonelli, Terry, Stout & Krass, LLP.

(57) ABSTRACT

Provided is a liquid crystal display device, in which a pretilt angle of liquid crystal molecules in a liquid crystal layer (21) is smaller than 2° and a first optically anisotropic layer (10) is formed between a first polarizing plate (12) and the first substrate (31). When a polar angle of the first optically anisotropic layer with respect to an in-plane vertical direction is denoted by φ, the first optically anisotropic layer compensates for a polarized state of light having a wavelength of 550 nm that enters the first optically anisotropic layer, the first optically anisotropic layer has a dichroic maximum value in a range of 430 nm or larger and 470 nm or smaller and has a dichroic maximum value in a range of 600 nm or larger and 650 nm or smaller when φ≠0 is satisfied.

15 Claims, 10 Drawing Sheets

LIQUID CRYSTAL PANEL AND LIQUID CRYSTAL DISPLAY DEVICE

CROSS-REFERENCE TO RELATED APPLICATION

The present application claims priority from Japanese application JP 2010-107088 filed on May 7, 2010, the content of which is hereby incorporated by reference into this application.

BACKGROUND OF THE INVENTION

1. Field of the Invention

The present invention relates to a liquid crystal panel and a liquid crystal display device.

2. Description of the Related Art

A liquid crystal display device can be thinner and lighter than a cathode ray tube (CRT, usually called a Braun tube) that was the leading display device in the twentieth century. In addition, along with the development of technologies to improve image quality such as a development of viewing angle expansion technology or a development of moving image technology, applications and markets of liquid crystal display devices have been expanded to include a monitor for a desktop personal computer, monitors for desktop publishing (DTP) and computer-aided design (CAD), and a television set.

In those applications, there is a strong demand for good color reproducibility and high contrast ratio. In particular, a display that can express dark black color without light leakage is a condition for high image quality. This is a necessary specification for expressing low gradation without blocked up shadows when a darkish image such as a movie is viewed in a dark room with reduced lighting or for expressing delicate color tone of a costume having a neutral tint with low saturation in an image of a performing arts such as opera.

Further, when a plurality of people view a large-screen liquid crystal display device, not only image quality when viewed from the direction vertical to the screen but also image quality when viewed from oblique directions is important. In particular, because light leakage in an oblique direction in a black display causes a substantial damage to the image display quality, it is necessary to take a measure to reduce the light leakage in the oblique direction.

The light leakage in the oblique direction in a black display of the liquid crystal display device is generated by (1) viewing angle dependence of a polarizing plate, (2) partial polarization cancellation due to a liquid crystal panel member inside the polarizing plate disposed orthogonally, (3) viewing angle dependence of a liquid crystal layer itself, and the like. As to an in-plane switching liquid crystal display device, the above-mentioned items (1) and (2) are main factors of the light leakage in the oblique direction in a black display. As to a vertically aligned liquid crystal display device, the above-mentioned items (1), (2), and (3) are main factors of the same.

Further, Japanese Patent No. 3526830 discloses optimal characteristics of a phase difference plate for reducing viewing angle dependence of the polarizing plate by theoretically determining birefringence characteristics for equalizing a polarized state of light that has passed through a polarizer in the case of oblique incidence to the polarized state in the case of perpendicular incidence. In addition, concerning the partial polarization cancellation due to a liquid crystal panel member, a technology of reducing light scattering by pigment particles of a color filter or the liquid crystal layer is reported as a technology for improving a contrast ratio in the vertical direction (front direction) in general. In addition, Japanese Patent No. 3863446 discloses optimal characteristics of a biaxial phase difference plate that compensates for retardation in the thickness direction of the vertically aligned liquid crystal layer and viewing angle characteristics of the polarizer. Note that, there are other prior art documents related to the present invention, which include Japanese Patent Application Laid-open No. 2000-137116, Japanese Patent Application Laid-open No. 2000-91734, Japanese Patent Application Laid-open No. 2001-235622, Japanese Patent Application Laid-open No. 2004-163452, and Japanese Patent Application Laid-open No. 2008-107766.

SUMMARY OF THE INVENTION

Conventional compensation technologies for oblique direction viewing angle include a compensation technology using a phase difference layer having birefringence characteristics described in Japanese Patent No. 3526830 and Japanese Patent No. 3863446, and a compensation technology using a dichroic dye. In any of the technologies, there is an influence of being a side effect.

In other words, in the case of the technology using the phase difference layer having birefringence characteristics, ideal compensation can be achieved only in a certain wavelength. This is because that chromatic dispersion of the refractive index is different among individual members. In this case, an optical constant of the phase difference layer is set so that the light leakage is reduced at a wavelength of 550 nm, which is most effective for reducing the light leakage (luminance) with a high luminosity factor. In this case, in the range of wavelength of 400 nm or larger and 500 nm or smaller as the blue wavelength and in the range of wavelength of 600 nm or larger and 700 nm or smaller as the red wavelength in the visible wavelength range, the light leakage occurs due to deviation from the optimal value. As a result, coloring of magenta or cyan becomes more conspicuous as the light leakage (luminance) in the oblique direction is reduced. In order to reduce the coloring, it is necessary to allow the light leakage to a certain extent. Therefore, coloring and intensity of light leakage have a trade-off relationship. An organic layer of various types, such as a protection film of the polarizing plate, a color filter layer, a liquid crystal layer, or an insulation layer, develops an in-plane phase difference (retardation) and a phase difference in the thickness direction. Therefore, it is difficult to cancel the trade-off relationship. Therefore, conventionally, there has been adopted a setting in which the coloring and the light leakage intensity are moderately suppressed.

On the other hand, in the technology of compensating for the viewing angle by giving a dichroic dye layer to a pair of polarizing plates so as to maintain polarizing ability in the oblique direction, an optically transparent state in the visible wavelength range cannot be achieved and luminance in a white display is decreased, because a dichroic ratio of the dichroic dye layer is not an ideal value and the alignmental order degree of dye molecules is not the ideal value of one. The contrast ratio of the liquid crystal display device is defined by dividing the luminance of a white display by the luminance of a black display. Therefore, there is a problem that if a light absorption degree in the black display is higher than a light absorption degree in the white display, the contrast ratio increases, but it is necessary to increase backlight intensity in order to maintain the luminance in the white display to be the same as the conventional level, resulting in an increase in power consumption.

As described above, in the conventional method aimed to reduce the light leakage in the oblique direction in the black display, it is difficult to avoid the side effect of an increase in power consumption due to the coloring or a conspicuous decrease in transmittance in the white display.

It is an object of the present invention to provide a liquid crystal panel and a liquid crystal display device that can suppress the coloring and the conspicuous decrease in the transmittance in the white display with respect to the light leakage in the oblique direction in the black display.

In order to solve the above-mentioned problems, a liquid crystal panel according to a first aspect of the present invention includes: a first polarizing plate and a second polarizing plate; a first substrate and a second substrate, which are disposed between the first polarizing plate and the second polarizing plate; a liquid crystal layer disposed between the first substrate and the second substrate; and a first optically anisotropic layer disposed between the first polarizing plate and the first substrate, in which: the liquid crystal layer includes liquid crystal molecules in horizontal alignment; the liquid crystal molecules are rotated by an electric field in a direction parallel to an in-plane direction of the first substrate; when a largest refractive index in a plane of the first optically anisotropic layer is denoted by $n_1x$, a refractive index in a direction orthogonal to a direction of the largest refractive index $n_1x$ is denoted by $n_1y$, and a refractive index in a thickness direction of the first optically anisotropic layer is denoted by $n_1z$, $n_1x \neq n_1y \neq n_1z$ is satisfied; when a polar angle of the first optically anisotropic layer with respect to an in-plane vertical direction is denoted by $\phi_1$, the first optically anisotropic layer compensates for a polarized state of any light having a wavelength of 530 nm or larger and 560 nm or smaller that enters the first optically anisotropic layer; and the first optically anisotropic layer has a dichroic maximum value in a range of 430 nm or larger and 470 nm or smaller and has a dichroic maximum value in a range of 600 nm or larger and 650 nm or smaller when $\phi_1 \neq 0$ is satisfied.

Further, in the liquid crystal panel according to the first aspect of the present invention, when $\Delta n$ is $(n_1x-n_1y)$, a thickness of the first optically anisotropic layer is denoted by d, and an Nz coefficient is $\{(n_1x-n_1z)/(n_1x-n_1y)\}$, a value of $\Delta n \cdot d$ may be 100 nm or larger and 200 nm or smaller, and a value of the Nz coefficient may be 0.2 or larger and 0.5 or smaller.

Further, in the liquid crystal panel according to the first aspect of the present invention, when $n_1x-n_1y=\Delta n$ is satisfied, the thickness of the first optically anisotropic layer is denoted by d, and $Nz=(n_1x-n_1z)/(n_1x-n_1y)$ is satisfied, $\Delta n_1 d$ of the first optically anisotropic layer may be 120 nm or larger and 150 nm or smaller, and Nz coefficient may be 0.3 or larger and 0.4 or smaller.

Further, in the liquid crystal panel according to the first aspect of the present invention, the first optically anisotropic layer may contain a hydrophilic polymer.

Further, in the liquid crystal panel according to the first aspect of the present invention, the first optically anisotropic layer may be adhered to a support film included in the first polarizing plate.

Further, in the liquid crystal panel according to the first aspect of the present invention, the first optically anisotropic layer may contain a first dye and a second dye, and the first dye and the second dye may be aligned in the in-plane vertical direction of the first optically anisotropic layer.

Further, in the liquid crystal panel according to the first aspect of the present invention, the first optically anisotropic layer may have a dichroic maximum value in the range of 430 nm or larger and 470 nm or smaller and have a dichroic maximum value in the range of 600 nm or larger and 650 nm or smaller when $43° < \phi < 47°$ is satisfied.

Further, in the liquid crystal panel according to the first aspect of the present invention, the first optically anisotropic layer may be formed through application.

Further, the liquid crystal panel according to the first aspect of the present invention may further include a second optically anisotropic layer formed between the second polarizing plate and the second substrate, in which: when a largest refractive index in a plane of the second optically anisotropic layer is denoted by $n_2x$, a refractive index in a direction orthogonal to a direction of the largest refractive index $n_2x$ is denoted by $n_2y$, and a refractive index in a thickness direction of the second optically anisotropic layer is denoted by $n_2z$, $n_2x \neq n_2y \neq n_2z$ may be satisfied; when a polar angle of the second optically anisotropic layer with respect to an in-plane vertical direction is denoted by $\phi_2$, the second optically anisotropic layer may compensate for a polarized state of light having a wavelength of 550 nm that enters the second optically anisotropic layer; and the second optically anisotropic layer may have a dichroic maximum value in a range of 430 nm or larger and 470 nm or smaller and have a dichroic maximum value in a range of 600 nm or larger and 650 nm or smaller when $\phi_2 \neq 0$ is satisfied.

Further, in the liquid crystal panel according to the first aspect of the present invention, the first optically anisotropic layer may contain a first dye and a second dye, and a sum of density of the first dye and density of the second dye with respect to the first optically anisotropic layer may be in a range of 0.1 wt % or larger and 5 wt % or smaller.

Further, in the liquid crystal panel according to the first aspect of the present invention, a pretilt angle of the liquid crystal molecules may be 1° or smaller.

A liquid crystal display device according to a second aspect of the present invention includes: any of the types of the liquid crystal panel described above; and a light source unit that emits light to the liquid crystal panel.

A liquid crystal panel according to a third aspect of the present invention includes: a first polarizing plate and a second polarizing plate; a first substrate and a second substrate, which are disposed between the first polarizing plate and the second polarizing plate; a liquid crystal layer disposed between the first substrate and the second substrate; a phase difference film disposed between one of the first substrate and the liquid crystal layer and between the first substrate and the first polarizing plate; and an optically anisotropic layer disposed between the first polarizing plate and the first substrate, in which: the phase difference film has an optically negative uniaxial property; an optical axis of the phase difference film is perpendicular to an in-plane direction of the phase difference film; a birefringence phase difference in a thickness direction of the phase difference film is 120 nm or larger and 250 nm or smaller; the liquid crystal layer includes liquid crystal molecules rotated by an electric field applied between the first substrate and the second substrate in a perpendicular direction; when a largest refractive index in a plane of the optically anisotropic layer is denoted by nx, a refractive index in a direction orthogonal to a direction having the largest refractive index in the plane of the optically anisotropic layer is denoted by ny, and a refractive index in the thickness direction of the optically anisotropic layer is denoted by nz, $nx \neq ny \neq nz$ is satisfied; when $\Delta n$ is $(nx-ny)$, a thickness of the optically anisotropic layer is denoted by d, and an Nz coefficient is $\{(nx-nz)/(nx-ny)\}$, a value of $\Delta n \cdot d$ is 100 nm or larger and 200 nm or smaller, and a value of the Nz coefficient is 0.2 or larger and 0.5 or smaller; the optically anisotropic layer contains a first dye and a second dye; and when a polar angle of the optically anisotropic layer with respect to a vertical direction is denoted by φ, the first dye has a dichroic maximum value in a range of 430 nm or larger and 470 nm or smaller when φ≠0 is satisfied, and the second dye has a dichroic maximum value in a range of 600 nm or larger and 650 nm or smaller when φ≠0 is satisfied.

Further, in the liquid crystal panel according to the third aspect of the present invention, the optically anisotropic layer may be disposed between the phase difference film and the first polarizing plate.

Further, a liquid crystal display device according to a fourth aspect of the present invention may include: the liquid crystal panel according to the third aspect of the present invention; and a light source unit that emits light to the liquid crystal panel.

According to the present invention, it is possible to provide a liquid crystal panel and a liquid crystal display device that can suppress the coloring and the conspicuous decrease in the transmittance in the white display with respect to the light leakage in the oblique direction in the black display. Other objects, structures, and effects than those described above may be apparent from description of embodiments below.

DETAILED DESCRIPTION OF THE INVENTION

With reference to FIGS. 1 to 18, embodiments of a liquid crystal display device according to the present invention are described. However, the present invention can be embodied in various forms, is not limited to the embodiments described below, and can be modified and changed variously by a skilled person in the art within the technical concept thereof. In addition, in these diagrams, the same or equivalent elements are denoted by the same numeral or symbol so that overlapping description is omitted.

First Embodiment

Figure 1:
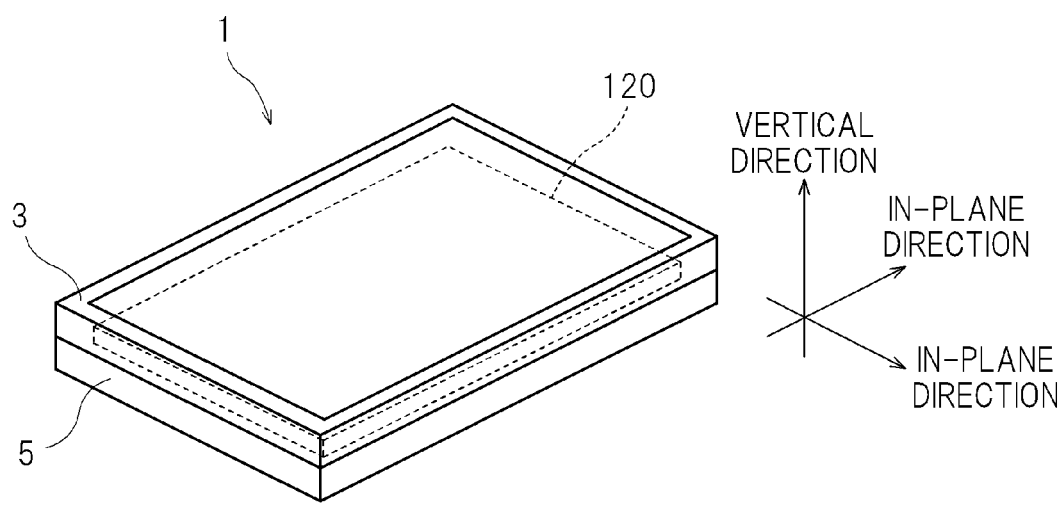
FIG. 1 is a view illustrating a liquid crystal display device according to a first embodiment of the present invention.

FIG. 1 is a view illustrating a liquid crystal display device 1 according to a first embodiment of the present invention. As illustrated in FIG. 1, the liquid crystal display device 1 includes a liquid crystal panel 120, an upper frame 3 and a lower frame 5 that sandwiches the liquid crystal panel 120 to hold the same, a light source unit 110 (not shown), and a circuit board (not shown) including circuit elements for generating information to be displayed.

Figure 2:
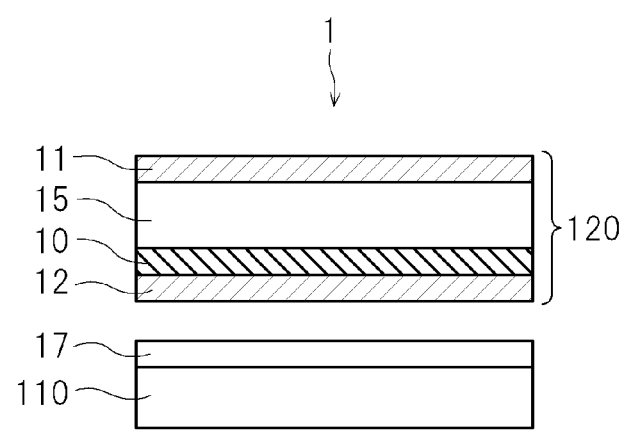
FIG. 2 is a schematic cross sectional view illustrating a liquid crystal panel and a backlight unit of the liquid crystal display device illustrated in FIG. 1.

FIG. 2 is a schematic cross sectional view illustrating the liquid crystal display device 1 illustrated in FIG. 1. The liquid crystal display device 1 includes a liquid crystal cell 15, an upper polarizing plate (analyzer) 11, a lower polarizing plate (polarizer) 12, an optical sheet 17, and the light source unit 110. The upper polarizing plate 11 and the lower polarizing plate 12 are disposed on outer sides of the liquid crystal cell 15 so as to sandwich the liquid crystal cell 15. The light source unit 110 is disposed on the rear side of the liquid crystal cell 15 (the side where the lower polarizing plate 12 exists with respect to the liquid crystal cell 15). The optical sheet 17 is disposed between the liquid crystal cell 15 and the light source unit 110. The light source unit 110 supplies light to the liquid crystal panel 120 via the optical sheet 17. The liquid crystal panel 120 includes the liquid crystal cell 15, the upper polarizing plate 11, and the lower polarizing plate 12.

Figure 3:
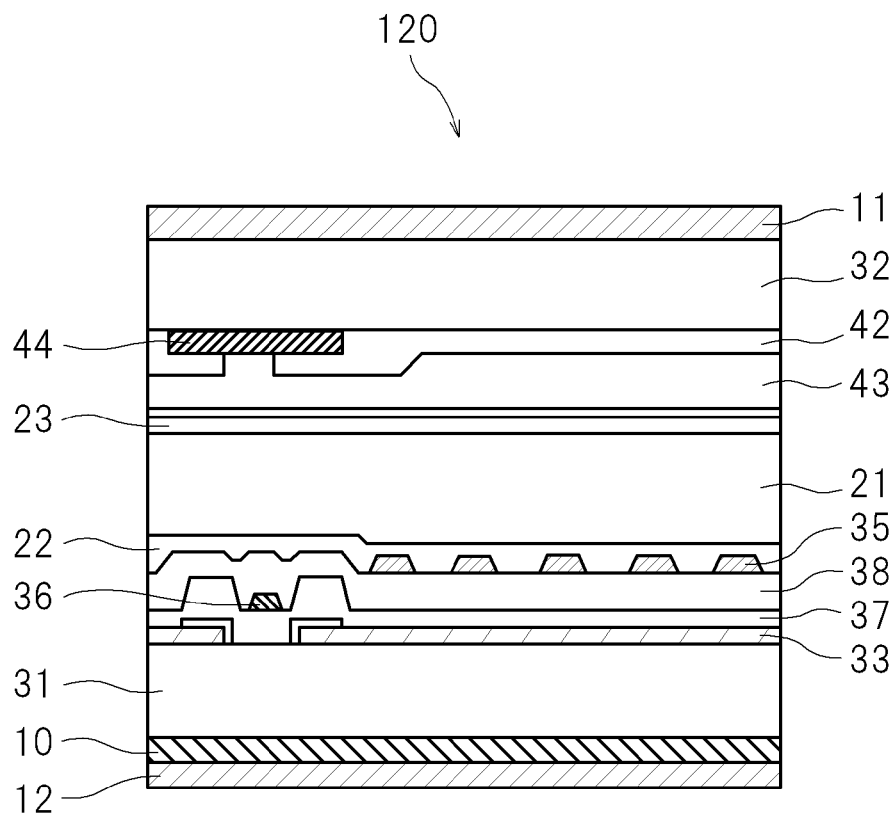
FIG. 3 is a schematic cross sectional view of one pixel (dot) and its vicinity of the liquid crystal panel illustrated in FIG. 2.
Figure 4:
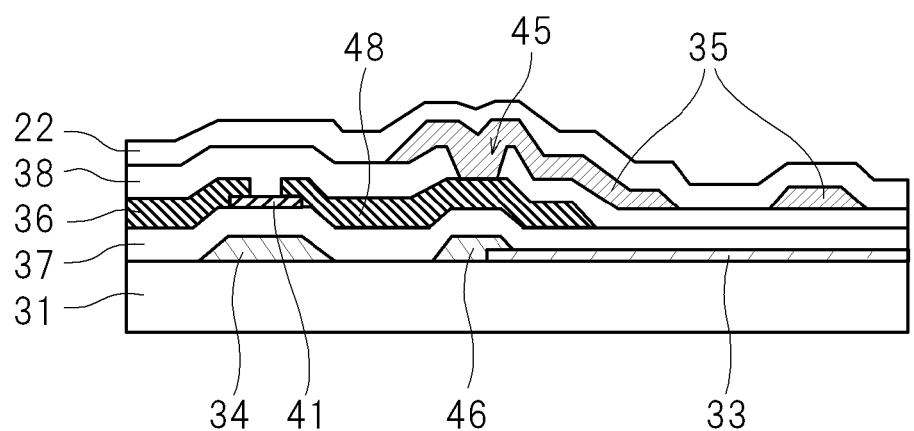
FIG. 4 is a schematic cross sectional view of an active element and its vicinity of the liquid crystal panel illustrated in FIG. 2.
Figure 5A:
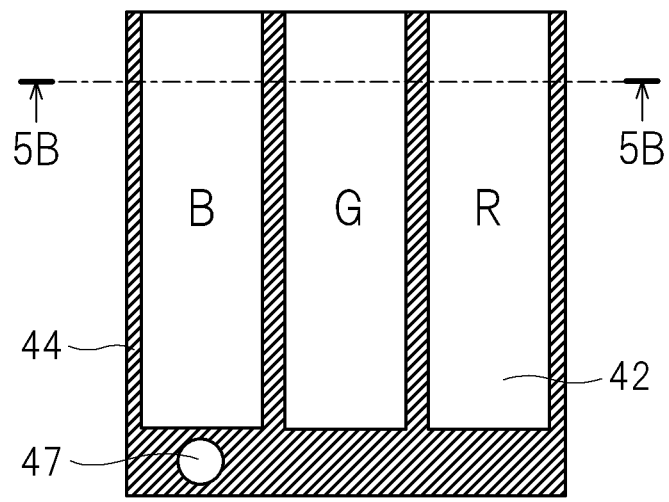
FIG. 5A is a schematic view of one picture element and its vicinity of a color filter substrate of the liquid crystal panel illustrated in FIG. 2.
Figure 5B:
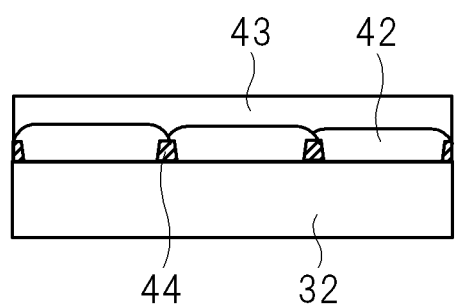
FIG. 5B is a cross sectional view taken along the line 5B-5B of the color filter substrate illustrated in FIG. 5A.

In addition, FIG. 3 is a schematic cross sectional view of one pixel (dot) and its vicinity of the liquid crystal panel 120 illustrated in FIG. 2. Here, if the lower polarizing plate 12 is regarded as a first polarizing plate while the upper polarizing plate 11 is regarded as a second polarizing plate, an active matrix substrate 31 is regarded as a first substrate while a color filter substrate 32 is regarded as a second substrate. In addition, if the lower polarizing plate (polarizer) 12 is regarded as the second polarizing plate while the upper polarizing plate (analyzer) 11 is regarded as the first polarizing plate, the active matrix substrate 31 is regarded as the second substrate while the color filter substrate 32 is regarded as the first substrate. FIG. 4 is a schematic view illustrating a structure of one pixel and its vicinity in the active matrix substrate of the liquid crystal panel 120 illustrated in FIG. 2. FIG. 5A is a schematic view of one picture element (one pixel that is constituted of three dots of R, G, and B pixels in this embodiment) and its vicinity in the color filter substrate of the liquid crystal panel 120 illustrated in FIG. 2, and FIG. 5B is a cross sectional view of the same. In the present invention, the in-plane direction and the vertical direction are defined as illustrated in FIG. 1.

In the liquid crystal display device 1 according to this embodiment, as illustrated in FIGS. 2 and 3, a complex optically anisotropic layer 10 is disposed between the liquid crystal cell 15 and the polarizer 12. Note that, the complex optically anisotropic layer 10 may be disposed between the liquid crystal cell 15 and the analyzer 11. In addition, it is possible to adopt a structure in which two complex optically anisotropic layers 10 are disposed between the liquid crystal cell 15 and the polarizer 12, and between the liquid crystal cell 15 and the analyzer 11.

If the complex optically anisotropic layer 10 is disposed between the liquid crystal cell 15 and the lower polarizing plate 12, it is possible to maintain polarization characteristics of the oblique incident light to be high. Thus, light scattering intensity generated in each member of the liquid crystal cell 15 can be reduced, and hence not only viewing angle characteristics in the oblique direction but also a light leakage in the front direction can be reduced. Absorption of visible light by the complex optically anisotropic layer 10 is not zero. Therefore, if it is also important to maintain luminance in a white display to be high, it is preferred to adopt the structure in which the complex optically anisotropic layer 10 is disposed between the liquid crystal cell 15 and the lower polarizing plate 12.

In addition, if the complex optically anisotropic layer 10 is disposed between the liquid crystal cell 15 and the upper polarizing plate 11, it is possible to reduce the light that has passed the liquid crystal cell 15 so that polarization thereof is partially canceled. If a color filter layer 42 is formed on the active matrix substrate 31 (color filter on array), the light scattering by the active matrix substrate 31, namely, the polarization cancellation becomes conspicuously large. Therefore, if it is important to maintain high luminance in the white display in the color filter on array, it is preferred to adopt the structure in which the complex optically anisotropic layer 10 is disposed between the liquid crystal cell 15 and the upper polarizing plate 11.

Further, if the complex optically anisotropic layers 10 are disposed between the liquid crystal cell 15 and the lower polarizing plate 12, and between the liquid crystal cell 15 and the upper polarizing plate 11, respectively, it is possible to maintain polarization characteristics of the oblique incident light and to cut off the light that has passed the liquid crystal cell 15 so that polarization thereof is partially canceled. Thus, the light leakage in the oblique direction can be reduced. With this structure, the light leakage in the oblique direction can be reduced more than the case where one complex optically anisotropic layer 10 is disposed. In this case, two complex optically anisotropic layers 10 are regarded as the first optically anisotropic layer and the second optically anisotropic layer.

[Active Matrix Substrate]

In FIG. 4, a common electrode 33 made of indium-tin-oxide (ITO), a scanning electrode (gate electrode) 34 made of molybdenum/aluminum (Mo/Al), and a common electrode line (common line) 46 are provided on the active matrix substrate 31. The common electrode line 46 is formed so as to overlap with the common electrode 33. Further, a gate insulating film 37 made of silicon nitride is formed so as to cover the common electrode 33, the scanning electrode 34, and the common electrode line 46. In addition, a semiconductor film 41 made of amorphous silicon or poly-silicon is disposed above the scanning electrode 34 through the gate insulating film 37. The semiconductor film 41 serves as an active layer of a thin film transistor (TFT) which is an active element. A signal electrode (drain electrode) 36 and a pixel electrode (source electrode) line 48 each made of chromium/molybdenum (Cr/Mo) are also disposed so as to overlap with part of the patterned semiconductor film 41. A protective insulating film 38 made of silicon nitride is formed so as to cover the semiconductor film 41, the signal electrode 36, and the pixel electrode line 48. Note that, the materials of the electrodes are not limited to those of this embodiment, and may be zinc oxide or indium-zinc-oxide (IZO) that are optically substantially transparent. The lines may contain copper. In addition, the protective insulating film 38 may be an organic insulation film that is optically substantially transparent.

As illustrated in FIG. 4, the pixel electrode (source electrode) 35 made of ITO is connected to the pixel electrode line 48 made of metal (Cr/Mo) via a through hole 45 formed in the protective insulating film 38. The pixel electrode 35 is disposed on the protective insulating film 38.

Figure 6:
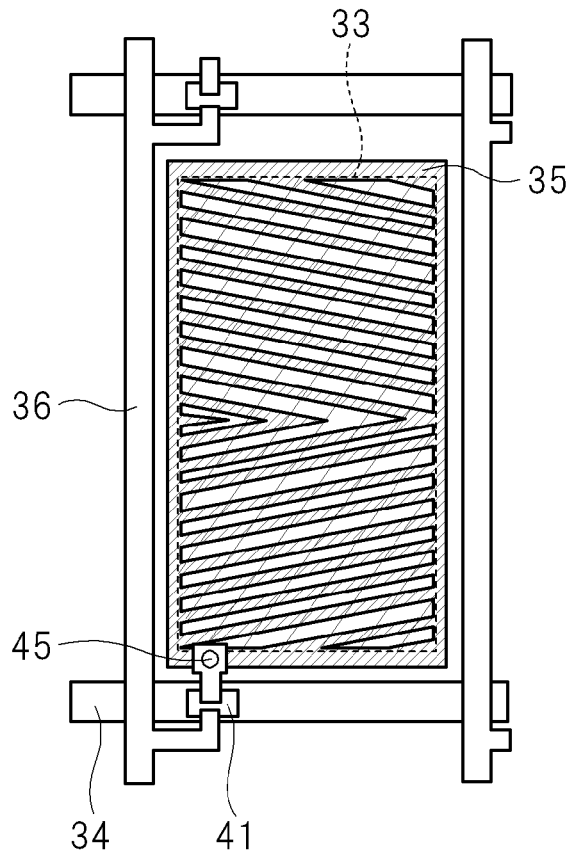
FIG. 6 is an enlarged plan view of one pixel of the liquid crystal panel illustrated in FIG. 2.

FIG. 6 is an enlarged plan view of one pixel in the liquid crystal display device according to this embodiment. As illustrated in FIG. 6, in the region of the one pixel, the common electrode 33 is formed like a flat plate in plan view, and the pixel electrode 35 is formed like comb teeth with a tilt of approximately 8° with respect to the short side direction of the pixel. The liquid crystal display device according to this embodiment has a diagonal size of 37 inches and 1,920×3 (RGB)×1,080 pixels supporting full high definition.

[Color Filter Substrate]

FIG. 5A schematically illustrates one picture element and its vicinity of the color filter substrate 32. FIG. 5B is a cross sectional view taken along the line 5B-5B in FIG. 5A. As illustrated in FIGS. 5A and 5B, a black matrix 44 is formed on the color filter substrate 32. The black matrix 44 is formed using a black resist by a photolithography method, which is a typical method, through the steps of application, pre-baking, exposure, development, rinsing, and post-baking. The film thickness of the black matrix 44 is set so that the optical density thereof becomes 3 or larger. Note that, it is possible to adopt a method of forming the black matrix 44 not by means of black resist but by means laminating the color filter layers 42.

Next, using color resists in three colors, according to the photolithography method, which is a typical method, the color filter layer 42 is formed through the steps of application, pre-baking, exposure, development, rinsing, and post-baking. In this embodiment, the film thickness of the color filter layer 42 is set to 3.0 µm for blue, 2.8 µm for green, and 2.7 µm for red. Note that, the film thickness of the color filter layer 42 may be adjusted appropriately with respect to desired color purity or thickness of the liquid crystal layer. In this embodiment, the black matrix 44 is formed so as to surround one pixel, and is formed in the region overlapping with the scanning electrode 34 of the active matrix substrate 31. In addition, it is possible to use the color filter substrate 32 in which the color filter layer 42 is formed by a method called an inkjet method in general. In this embodiment, the additive color mixture method of RGB three primary colors is adopted, but this is not the limitation. For instance, a display method with four primary colors with additional yellow or cyan, or a display method with five primary colors with additional yellow and cyan may be adopted. Alternatively, it is possible to adopt a method of lightening a part of the primary colors or an RGBW method in which a transparent layer is added. In addition, this embodiment adopts the structure in which the active matrix substrate and the color filter substrate are opposed to each other. However, it is possible to adopt a so-called color filter on array method in which the color filter is formed on the active matrix substrate.

Next, for purposes of flattening and protection of the color filter layer 42, an overcoat layer 43 is formed on the color filter layer 42. When a photosensitive resin is used for the overcoat layer 43, the overcoat layer 43 is cured by irradiation of ultraviolet rays (for example, i-rays) and heating after applying the resin. When a thermosetting resin is used for the overcoat layer 43, the overcoat layer 43 is cured at a predetermined temperature for a predetermined period after applying the resin. Note that, the overcoat layer 43 may not be formed if the color filter layer 42 is formed relatively evenly in the pixel, and if it is possible to prevent contamination of the liquid crystal due to migration of compound as a unit structure of resin that is not sufficiently cross-linked by the color filter layer 42, additive such as reaction start agent, or impurities.

A columnar spacer 47 is formed on the black matrix 44 in a portion that is sandwiched between blue pixels. The columnar spacer 47 is formed by the photolithography method and an etching process, which are typical methods, using a photosensitive resin to have a height of approximately 3.8 μm. Note that, the position where the columnar spacer 47 is formed can be any position corresponding to necessity and is not limited to that of this embodiment. In addition, it is possible to use ball spacers, which are selectively disposed at predetermined positions.

[Liquid Crystal Panel]

The liquid crystal cell 15 includes a liquid crystal layer 21, an alignment control film 22, an alignment control film 23, the active matrix substrate 31, the color filter substrate 32, the common electrode 33, the scanning electrode 34, the pixel electrode 35, the signal electrode 36, the gate insulating film 37, the protective insulating film 38, the semiconductor film 41, the color filter layer 42, the overcoat layer 43, the black matrix 44, the common electrode line 46, the columnar spacer 47, and the pixel electrode line 48.

In FIG. 3, the alignment control film 22 and the alignment control film 23 are formed on the active matrix substrate 31 and on the color filter substrate 32, respectively, so that liquid crystal molecules are aligned in a predetermined direction. A polyamic acid containing 1,3-dimethyl-1,2,3,4-cyclobutane-tetracarboxylic dianhydride as an acid dianhydride and m-phenylenediamine as a diamine compound is printed and formed on the surface of the substrate, and is heated at 180° C. using far infrared rays while being irradiated with infrared polarized light. Thus, the alignment control film 22 and the alignment control film 23 are formed. As a light source for emitting the infrared polarized light, a high-pressure mercury lamp is used. The infrared rays of wavelength in the range of 240 nm or larger and 380 nm or smaller were extracted via an interference filter to be linearly polarized light having a polarization ratio of approximately 10:1 using a pile polarizer made of piled quartz substrates. The extracted infrared rays were projected with irradiation energy of approximately 5 J/cm$^2$. The alignment directions of liquid crystal molecules existing on the surfaces of the alignment control film 22 and the alignment control film 23 are orthogonal to the polarization direction of the projected infrared polarized light.

Next, a sealing agent was applied to the periphery of one of the substrates, and nematic liquid crystal composition was applied by the inkjet method. Then, the active matrix substrate 31 and the color filter substrate 32 were disposed opposed to each other, and thus the liquid crystal cell 15 was assembled. Physical values of the nematic liquid crystal composition are as follows. The dielectric constant anisotropy is +3.3 (at 1 kHz and 20° C.). The refractive index anisotropy is 0.099 (at wavelength of 589 nm and 20° C.). The average value of an elastic constant of a splay, an elastic constant of a twist, and an elastic constant of a bend is 14.1 pN (at 20° C.)

The retardation ($\Delta$snd) of this liquid crystal panel is approximately 0.37 μm at a wavelength of 550 nm. A liquid crystal cell of homogeneous alignment was made using a material equivalent to that of the alignment control film and the liquid crystal composition used for the liquid crystal panel, and a pretilt angle of the liquid crystal was measured by using a crystal rotation method. Then, the pretilt angle was approximately 0.2°. In the present invention, the retardation ($\Delta$nd) of the liquid crystal panel is a measured value at a wavelength of 550 nm in the vertical direction of the liquid crystal cell 15.

The lower polarizing plate 12, the upper polarizing plate 11, and the complex optically anisotropic layer 10 were adhered to the liquid crystal cell 15. A polarization axis of the polarizing layer included in one of the lower polarizing plate 12 and the upper polarizing plate 11 was set to be substantially parallel to the liquid crystal alignment direction while a polarization axis of the polarizing layer included in the other polarizing plate was set to be orthogonal to the liquid crystal alignment direction. The phrase "substantially parallel" means the case where the absolute value of the angle between the liquid crystal alignment direction and the polarization axis of the polarizing layer included in one of the lower polarizing plate 12 and the upper polarizing plate 11 is 0° or larger and 1° or smaller. The optical axis of the complex optically anisotropic layer 10 was set to be substantially parallel to the polarization axis of the polarizing layer of the lower polarizing plate 12 that is in vicinity to the complex optically anisotropic layer 10 and/or to the polarization axis of the polarizing layer of the upper polarizing plate 11. A transmission axis of the polarizing layer of the lower polarizing plate 12 was set to the direction of the long side of the substrate, and a transmission axis of the polarizing layer of the upper polarizing plate 11 was set to the short side direction of the substrate. After that, a driving circuit (not shown), the light source unit 110, and the like were connected to the liquid crystal panel 120 to be a module, and thus the liquid crystal display device 1 was obtained. In this embodiment, a normally closed method was adopted in which the black display is realized when no voltage or a low voltage is applied while the white display is realized when a high voltage is applied.

[Light Source Unit]

Examples of a light source of the light source unit 110 include a direct type light source using a three-wavelength fluorescent tube, a direct type light source or a side light (edge light) type light source using light emitting diodes, a planar light source using an organic EL, and the like. As the optical sheet 17, in the case of the direct type light source or the planar light source, a diffuser plate, a diffuser sheet, a prism sheet, a polarization conversion sheet, and the like may be used. In the case of the side light type light source, a light guide plate for the optical sheet 17 is necessary. Note that, the fluorescent tube may be any one of a hot cathode tube, a cold cathode tube, and an external electrode type.

[Complex Optically Anisotropic Layer]

The largest refractive index in the plane of the complex optically anisotropic layer 10 is denoted by nx, the refractive index in the direction orthogonal to the direction in which the refractive index becomes the largest in the plane of the complex optically anisotropic layer 10 is denoted by ny, the refractive index in the thickness direction of the complex optically anisotropic layer 10 is denoted by nz, where nx−ny=Δn is satisfied, and the thickness of the complex optically anisotropic layer 10 is denoted by d. In the in-plane vertical direction of the complex optically anisotropic layer 10, Δnd at a wavelength of 550 nm is preferably 100 nm or larger and 200 nm or smaller, and is more preferably 120 nm or larger and 150 nm or smaller. In addition, the Nz coefficient defined by the following equation (1) is preferably 0.2 or larger and 0.5 or smaller, and is more preferably 0.3 or larger and 0.4 or smaller. Further, the complex optically anisotropic layer 10 has dichroic maximum values in the range of wavelength of 430 nm or larger and 470 nm or smaller and in the range of wavelength of 600 nm or larger and 650 nm or smaller, when the polar angle φ is not 0° in FIG. 7 (the polar angle with respect to the in-plane vertical direction of the complex optically anisotropic layer 10 is denoted by φ).

[Equation 1]

$$Nz=(nx-nz)/(nx-ny) \quad (1)$$

The complex optically anisotropic layer 10 is made of a birefringent compound that develops the former refractive index anisotropy and can be controlled to be a predetermined value, and a dichroic dye that develops the latter dichroism. In this case, for making the complex optically anisotropic layer 10, it is necessary that the birefringent compound is a liquid crystal compound having a function of aligning the dichroic dye to a predetermined direction or to use a component (host polymer or the like) to align the birefringent compound and the dichroic dye to a predetermined direction. For instance, if the dichroic dye molecule has a substantially rod-like shape, the dye molecules can be aligned to the in-plane vertical direction of the complex optically anisotropic layer 10 so that the viewing angle can be compensated for. Alternatively, if the dichroic dye molecule has a discotic flat surface structure, the viewing angle can be compensated for by aligning the discotic surface in the in-plane vertical direction of the complex optically anisotropic layer 10. In order to align the dye to be used in the in-plane vertical direction of the complex optically anisotropic layer 10, a hydrophilic or hydrophobic functional group is introduced into the birefringent compound or the host polymer, or a polar group is introduced into the birefringent compound or the host polymer for the control.

The birefringent compound is, for example, a substance that is substantially transparent in the range of visible wavelength (400 nm or larger and 700 nm or smaller), and is obtained by causing alignment in the two directions, that is the in-plane direction and the thickness direction of the complex optically anisotropic layer 10. Specific examples of the birefringent compound include a cellulose derivative described in Japanese Patent Application Laid-open No. 2000-137116 and Japanese Patent Application Laid-open No. 2000-91734, and a copolymer having a norbornene chain and a styrene chain described in Japanese Patent Application Laid-open No. 2001-235622. Examples of a method of causing alignment in the two directions include a method of uniaxially stretching the film made of the above-mentioned substance in the in-plane direction and then stretching both surfaces in the thickness direction by adhesive rollers, a method of uniaxially stretching the film in the in-plane direction and then appropriately contracting the film in the direction opposite to the stretching direction so as to cause alignment in the thickness direction, and a method of uniaxially stretching the film in the in-plane direction and then applying an electric field or a magnetic field in the thickness direction so as to cause alignment in the thickness direction.

In addition, the dye (first dye) developing the dichroic maximum value in the range of wavelength of 430 nm or larger and 470 nm or smaller is only required to be a yellowish dichroic dye, and there are G-206, G-232, G-470, and the like, for example. The dye (second dye) developing the dichroic maximum value in the range of wavelength of 600 nm or larger and 650 nm or smaller is only required to be a bluish dichroic dye, and there are G-256, G-289, G-472, and the like, for example. The dichroic dye depends on the alignmental order degree, and a single molecule can also develop the dichroism. Therefore, the dichroic maximum value can be selected by measuring the dichroism in solution in which dichroic dyes are dissolved in a predetermined solvent (preferably, solvent that is used for the optically anisotropic layer), the birefringent compound, a solvent considering a polarity of the host polymer (waterborne, organic solvent having high polarity, organic solvent having low polarity), or the like.

These dyes, namely, the first dye and the second dye, are dispersed in the birefringent compound at 0.1 wt % or larger and 5 wt % or smaller and are stretched so that the complex optically anisotropic layer 10 is obtained. Because the birefringent compound or the host polymer is selected so that the optical axis of the dichroic dye is aligned substantially perpendicular to the in-plane direction of the complex optically anisotropic layer 10, the optical axis of the dichroic dye is maintained in the substantially perpendicular direction even if the film is uniaxially stretched. Thus, absorption in the front direction of the complex optically anisotropic layer 10 is reduced, and hence the light leakage in the oblique direction can be effectively absorbed. The phrase "substantially perpendicular" means that the angle between the alignment direction of the optical axis of the dichroic dye and the vertical direction of the complex optically anisotropic layer 10 is 80° or larger and 100° or smaller.

In addition, there is the complex optically anisotropic layer 10 containing a liquid crystal component and an absorption type dichroic dye with a matrix of hydrophilic polymer. Examples of the hydrophilic polymer include a cellulose derivative and a polyvinyl alcohol derivative described in Japanese Patent Application Laid-open No. 2004-163452. Examples of the liquid crystal component include an acrylic monomer, an acrylic ester derivative, and the like. The complex optically anisotropic layer 10 is obtained by dispersing the above-mentioned dichroic dye or the like in the hydrophilic polymer and the liquid crystal component and by stretching the film. In this case, if the cellulose derivative is used as the hydrophilic polymer, through the uniaxially stretching process, the dichroic dye is apt to be aligned in the direction perpendicular to the surface of the complex optically anisotropic layer 10, and hence the aligning process can be simple.

In addition, for example, a bicyclic or tricyclic mesogenic group to be a liquid crystal component may be introduced as a side chain to the polyvinyl alcohol derivative, so that the dichroic dye is dispersed in a so-called vertical alignment matrix. In this case too, only through the uniaxially stretching process, the dichroic dye can be aligned to the direction that is substantially perpendicular to the surface direction.

The thickness of the complex optically anisotropic layer 10 is determined by Δnd and the Δn of the liquid crystal component.

The value of Δn of the liquid crystal component is approximately 0.2 or larger and 0.3 or smaller. Therefore, the complex optically anisotropic layer 10 becomes a thin film having a thickness smaller than 1 μm. Therefore, the method is also appropriate which includes applying to a support film having little absorption in the visible wavelength range by means of gravure printing, roll coat, applicator, die coat, or the like, drying, and heating for cross-linking (in the case of including a cross-linking agent). The method of application is advantageous for forming a viewing angle compensation film for a large screen display because it is easier to form a large width film than the stretching method. If the structure of the lower polarizing plate 12 or the upper polarizing plate 11 is constituted of a polarizing layer (a resin layer containing iodine and dichroic dye) and protective layers that are adhered to both sides thereof, the protective layers being substantially transparent in the visible wavelength range, the support film can also work as a protective layer of the lower polarizing plate 12 or the upper polarizing plate 11. In this case, the complex optically anisotropic layer 10 is adhered to the support film (protective layer) included in the lower polarizing plate 12 or the upper polarizing plate 11. In addition, it is possible to adopt a process in which the support film on which the complex optically anisotropic layer 10 is formed is adhered to the polarizing layer of the upper polarizing plate 11 or the polarizing layer of the lower polarizing plate 12 as a protective layer of the upper polarizing plate 11 or the lower polarizing plate 12. It is also possible to directly apply the polarizing layer constituting the lower polarizing plate 12 or the upper polarizing plate 11 to the support film that is adhered to the polarizing layer complex optically anisotropic layer 10.

Figure 7:
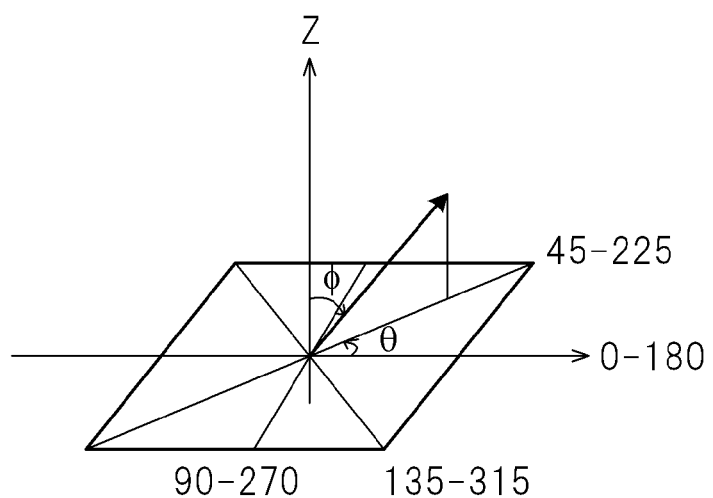
FIG. 7 is a diagram illustrating definitions of azimuth and polar angle directions with respect to an optically anisotropic layer.

The definition of the angle of the complex optically anisotropic layer 10 formed in this way is described with reference to FIG. 7. In FIG. 7, the z axis direction is the front direction (vertical direction of the complex optically anisotropic layer 10), which is the same meaning as the front direction in the liquid crystal display device. The in-plane azimuth of the complex optically anisotropic layer 10 is denoted by θ, and the polar angle direction from the z axis to the in-plane is denoted by φp. The front direction is θ=φ=0°. In FIG. 7, the axis indicated by 0-180 is defined to be the polarization transmission axis of the complex optically anisotropic layer 10. Here, the azimuth θ is defined in the left-handed direction (counterclockwise) with respect to the right side of the axis indicated by 0-180 in FIG. 7 as 0°, and is indicated by axes of 45-225, 90-270, and 135-315. Hereinafter, if "θ=45°" is expressed, an optical characteristic at an azimuth of 45° and at a polar angle of 45° is shown. If "θ=90°" is expressed, an optical characteristic at an azimuth of 90° and at a polar angle of 45° is shown. Other than the expression of the front direction, unless otherwise noted, a characteristic at a polar angle φ of 45° is shown. As to the standard viewing condition of a high definition television broadcast, it is supposed to view at a distance of three times the height of the screen. However, in order to obtain high realistic sensation, a viewer may view at a distance of two times the height of the screen. In this case, light enters the eye (retina) of the viewer from the screen with a maximum visual angle of 48°. Specifically, the case may be considered where the viewer is positioned at the end side of the television set. Therefore, the angle φ=45° is set considering a visual angle for obtaining higher realistic sensation when viewing a large screen television set. The above discussion is true even in the case where 43°<φ<47° is satisfied.

An evaluation of optical characteristics of the complex optically anisotropic layer 10 is performed as follows. The complex optically anisotropic layer 10 is disposed on the side closer to the lower polarizing plate 12 between the upper polarizing plate 11 and the lower polarizing plate 12, and the light is allowed to enter from the front direction, from each azimuth direction, and from the polar angle direction. The usual iodine stretched polarizing plate (having a parallel/orthogonal contrast ratio of the polarizing plate itself that is 25,000 or larger) is disposed as the upper polarizing plate 11 in the substantially vertical direction with respect to the incident light, and a spectral transmittance is evaluated in the case where the polarization axis of the polarizing layer of the upper polarizing plate 11 and the polarization axis of the polarizing layer of the lower polarizing plate 12 are disposed to be parallel to each other and in the case where those are disposed to be orthogonal to each other.

Figure 8:
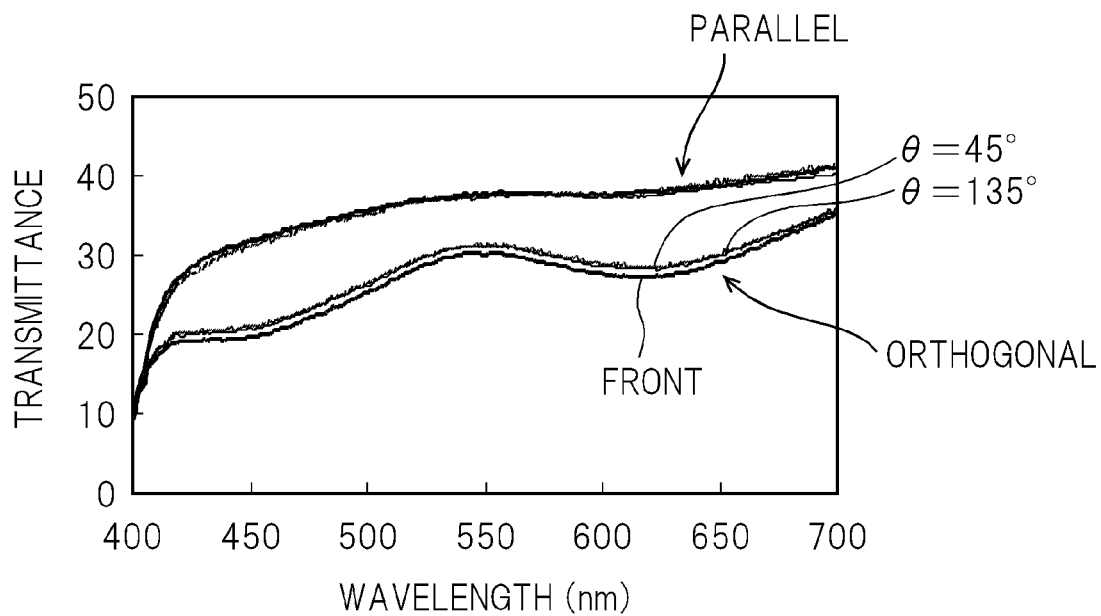
FIG. 8 illustrates spectral characteristics indicating dependence on angle of anisotropy (polarization) in the complex optically anisotropic layer of the liquid crystal panel illustrated in FIG. 2.
Figure 9:
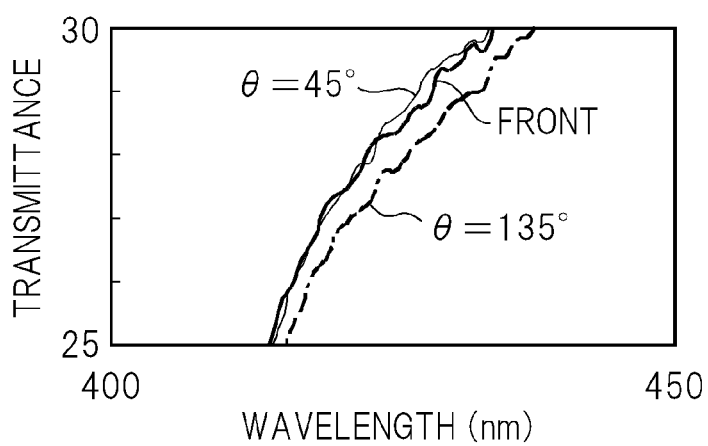
FIG. 9 is a graph indicating the parallel spectral transmittances at wavelengths from 400 nm to 500 nm illustrated in FIG. 8 in an enlarged manner.
Figure 10:
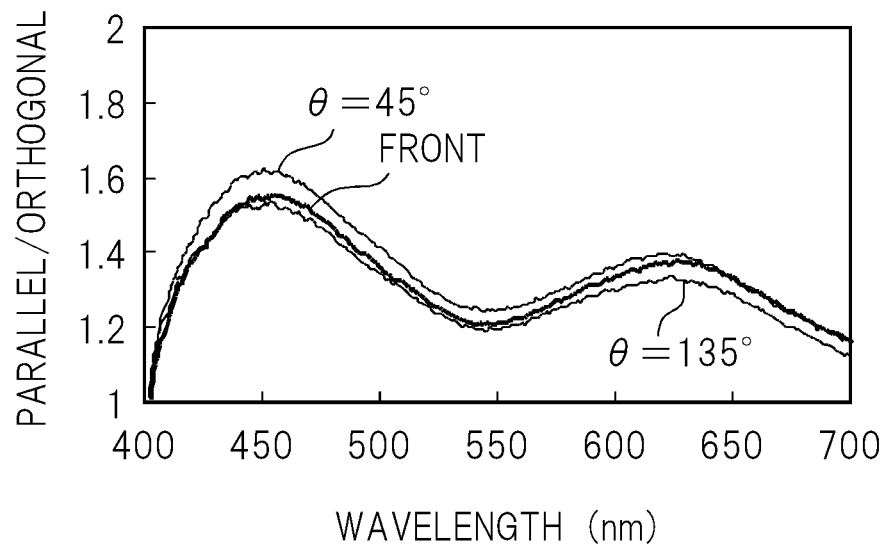
FIG. 10 is a graph indicating a parallel/orthogonal spectral transmittance ratio in the complex optically anisotropic layer illustrated in FIG. 8.
Figure 11:
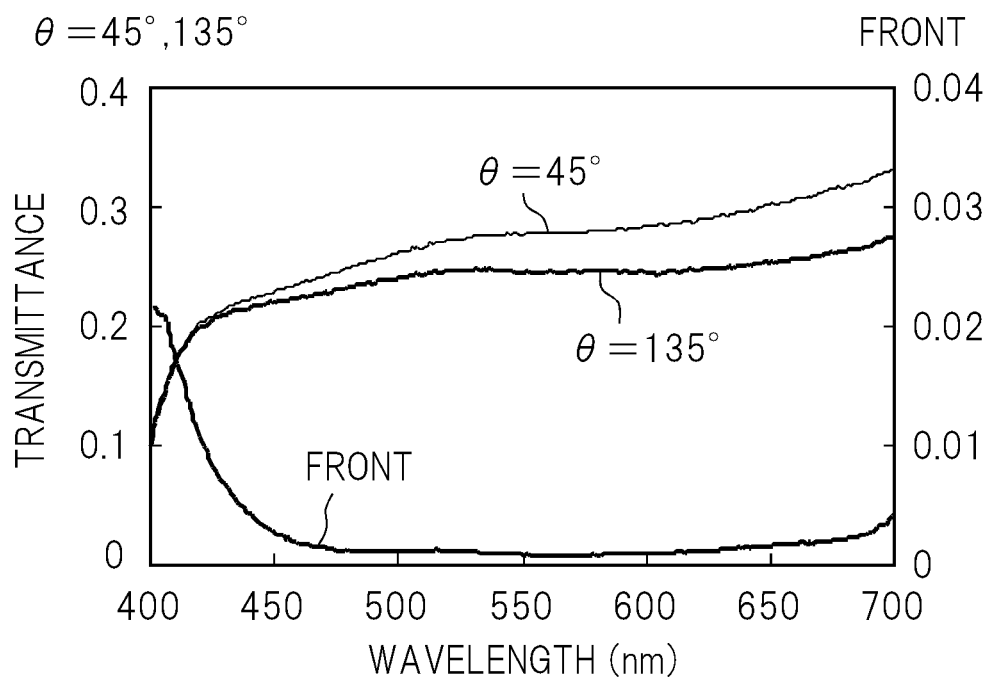
FIG. 11 illustrates orthogonal spectral transmittance indicating dependence on angle of anisotropy (polarization) of an iodine stretched polarizing layer as a comparative example.
Figure 12:
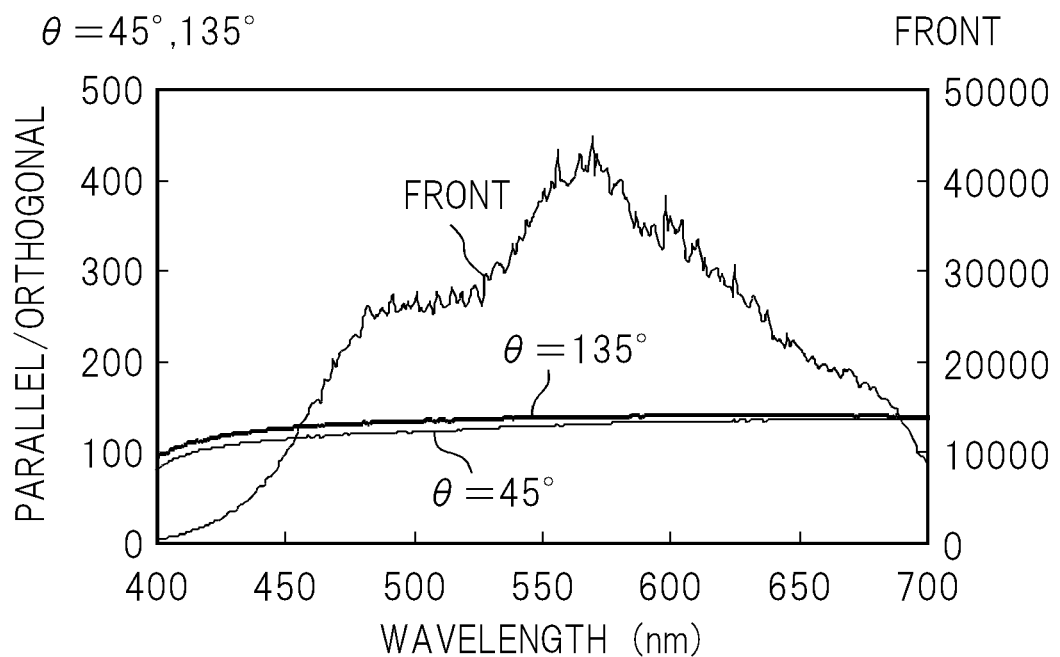
FIG. 12 is a graph indicating the parallel/orthogonal spectral transmittance ratio in the iodine stretched polarizing layer illustrated in FIG. 11.

FIG. 8 illustrates the parallel and orthogonal spectral transmittances at the front, at θ=45°, and at θ=135°. FIG. 9 is a graph indicating the parallel spectral transmittances at wavelengths from 400 nm to 500 nm illustrated in FIG. 8 in an enlarged manner. FIG. 10 is a graph indicating a ratio between the parallel spectral transmittance and the orthogonal spectral transmittance. The orthogonal spectral transmittance and the parallel spectral transmittance depend little on the angles thereof, and hence substantially the same spectral transmittance characteristics can be obtained. This is a feature of the complex optically anisotropic layer 10. Usually, θ=45°, θ=135°, θ=225°, and θ=315° are called an off-axis, and the orthogonal spectral characteristics are largely different from those at the front direction. For instance, if the same measurement is performed for the polarizing plate that is used as the upper polarizing plate 11, the light leakage is larger at θ=45° and θ=135° than at the front direction as indicated by the orthogonal transmittance characteristics illustrated in FIG. 11. This is the viewing angle characteristic of the polarizing plate in the case without the complex optically anisotropic layer 10. Note that, concerning the spectral transmittance characteristics in the parallel arrangement, there is little dependence on these angles of the polarizing plate in the case without the complex optically anisotropic layer 10, too.

Figure 13:
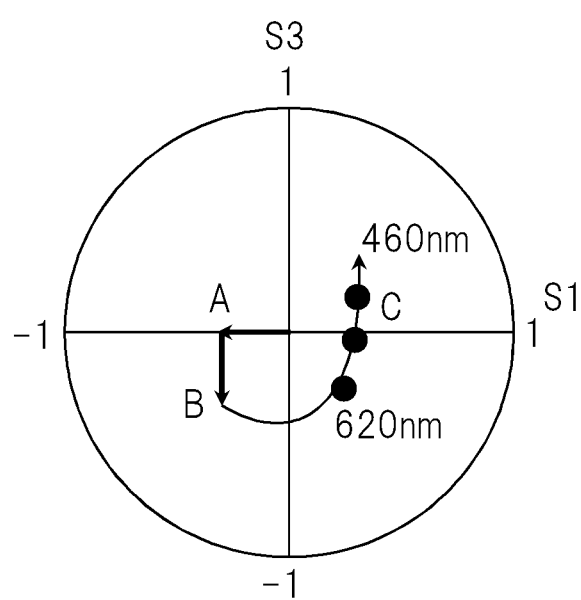
FIG. 13 is a diagram illustrating a viewing angle compensation principle of the complex optically anisotropic layer of the liquid crystal panel illustrated in FIG. 2.

A function of the complex optically anisotropic layer 10 combined with the lower polarizing plate 12 is described using a Poincare sphere display illustrated in FIG. 13. With respect to incidence from the direction of θ=φ=45°, the polarized state of the lower polarizing plate 12 becomes as indicated by A. The polarized state A becomes the polarized state B due to the birefringence in the thickness direction of triacetyl cellulose that is used as the protective layer of the lower polarizing plate 12. This is adjusted to agree with the polarized state C of the upper polarizing plate 11 (so that the polarized state of the light entering the complex optically anisotropic layer 10 is compensated for), which is the principle of the viewing angle compensation. Here, because of the refractive index chromatic dispersion of the phase difference film, it is difficult to achieve the viewing angle compensation to the polarized state C by the phase difference film only at a certain wavelength. Therefore, the complex optically anisotropic layer 10 has retardation for compensation to the polarized state C at a wavelength of 550 nm so that light having a wavelength shorter than 550 nm or a wavelength longer than 550 nm is absorbed by the dichroic dye. Thus, the complex optically anisotropic layer 10 develops light leakage blocking performance that is almost achromatic (achromatic color). In addition, if the complex optically anisotropic layer 10 has retardation for compensation to the polarized state C at any wavelength of 530 nm or larger and 560 nm or smaller, light of wavelengths shorter than the wavelength compensated by the complex optically anisotropic layer 10 and light of wavelengths longer than the wavelength compensated by the complex optically anisotropic layer 10 may be absorbed by the dichroic dye. For instance, if an RGB-LED backlight unit is used as the light source unit 110, the light leakage can be reduced when the complex optically anisotropic layer 10 has retardation for compensation to the polarized state C at a wavelength of 537 nm. Note that, if a film having small birefringence, for example, an olefin film or the like is used for the protective layer of the upper polarizing plate 11 and the lower polarizing plate 12 or the support film of the complex optically anisotropic layer 10 instead of the triacetyl cellulose, the change from A to B in FIG. 13 is decreased. Therefore, depending on the birefringence of the film to be used, the liquid crystal component of the complex optically anisotropic layer 10 may be controlled. In this case, the control is easily achieved by changing the thickness of the complex optically anisotropic layer 10 formed by application or stretching without necessity of adding a modification to the dichroic dye. Therefore, the complex optically anisotropic layer 10 can be easily manufactured.

[Measurement Result]

The complex optically anisotropic layer 10 was disposed between the lower polarizing plate 12 and the liquid crystal cell 15, and viewing angle characteristics of the contrast ratio and viewing angle characteristics of chromaticity in a black display were measured by using an EZ contrast measuring device made by ELDIM Corporation. In the liquid crystal cell of this embodiment, the pretilt angle of the liquid crystal molecules in the liquid crystal layer was approximately 0.2°, and the liquid crystal molecules in the liquid crystal layer had horizontal alignment. Note that, it is preferred that the pretilt angle of the liquid crystal molecules in the liquid crystal layer be smaller than 2°. Further, it is preferred that the pretilt angle of the liquid crystal molecules in the liquid crystal layer is 0.2° or smaller. In addition, the liquid crystal molecules are rotated by an electric field in the direction parallel to the in-plane direction of the active matrix substrate 31.

The characteristics of the complex optically anisotropic layer 10 in this embodiment are as illustrated in FIGS. 8 to 10, in which $\Delta nd$ is 135 and the Nz coefficient is 0.35 at a wavelength of 550 nm.

If $\Delta nd$ is smaller than 100 nm, the compensation of the complex optically anisotropic layer 10 at 550 nm does not reach the axis S1 illustrated in FIG. 13, resulting in an increase of the light leakage at 550 nm. Because the light at 550 nm has a large luminosity factor, the influence to the increase of light leakage is increased. On the other hand, if $\Delta nd$ is larger than 200 nm, the compensation of the complex optically anisotropic layer 10 at 550 nm exceeds the axis S1 illustrated in FIG. 13, resulting also in an increase of the light leakage at 550 nm. In addition, it is found from the experiment that if the Nz coefficient deviates from the range of 0.2 or larger and 0.5 or smaller, to be 0.1 or smaller in particular, the light leakage in the oblique direction is increased.

Figure 14:
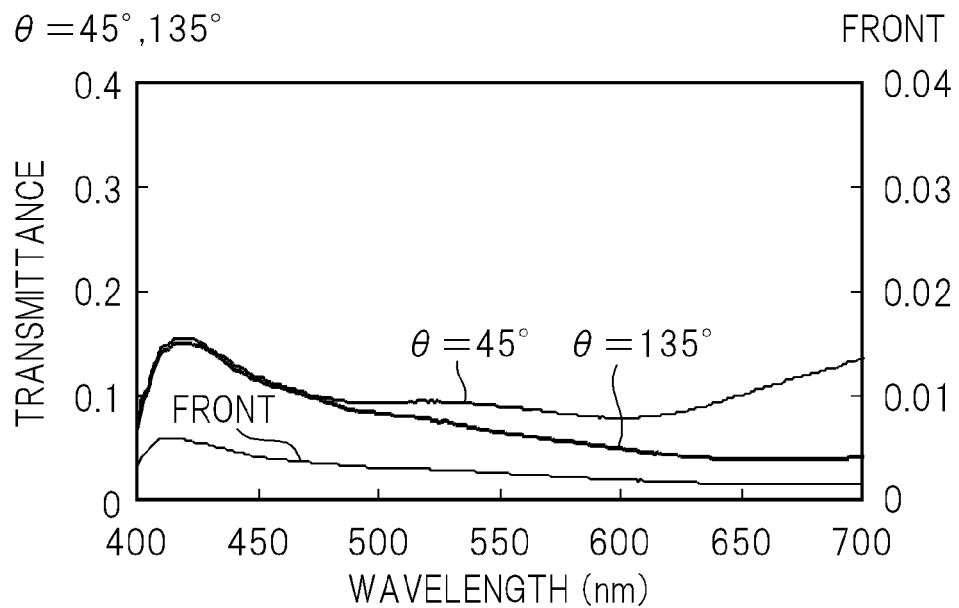
FIG. 14 illustrates the orthogonal spectral transmittance indicating viewing angle compensation characteristics of the complex optically anisotropic layer of the liquid crystal panel illustrated in FIG. 2.
Figure 15:
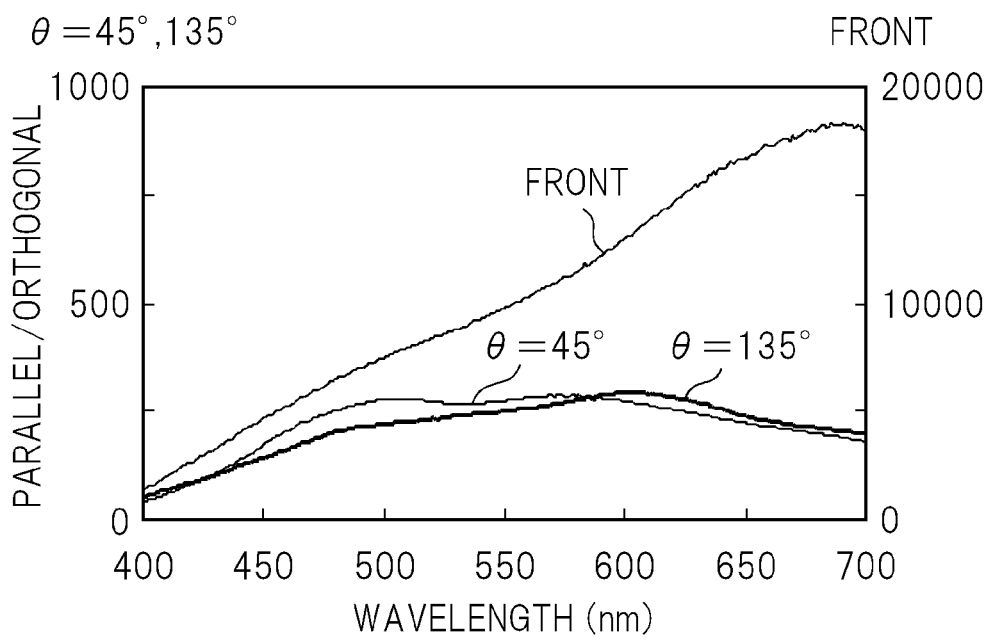
FIG. 15 is a graph indicating the parallel/orthogonal spectral transmittance ratio in the complex optically anisotropic layer illustrated in FIG. 14.

In addition, the complex optically anisotropic layer 10 in this embodiment was formed by applying a film on the film made of triacetyl cellulose, which was adhered to the lower polarizing plate 12 using an adhesive that is substantially optically isotropic with the lower polarizing plate 12. Further, a substantially optically isotropic adhesive was formed on the complex optically anisotropic layer 10, which was adhered to the liquid crystal cell 15. The liquid crystal panel 120 includes, in order from the light source unit 110, the lower polarizing plate 12, the adhesive, the triacetyl cellulose film, the complex optically anisotropic layer 10, the adhesive, and the liquid crystal cell 15. In this case, the orthogonal transmittance in the state of being adhered to the lower polarizing plate 12 is illustrated in FIG. 14, and the parallel/orthogonal transmittance ratio is illustrated in FIG. 15. It is understood that the light leakage in the off-axis direction is largely improved at azimuths of 45° and 135° compared with the characteristics of the polarizer 12 illustrated in FIGS. 11 and 12. Note that, the characteristics at an azimuth of 225° are substantially the same as those at an azimuth of 45°, while the characteristics at an azimuth of 315° are substantially the same as those at an azimuth of 135°. Thus, the parallel/orthogonal ratio indicating polarization degree performance of the polarizing plate is also improved. Note that, the parallel transmittance in the state of being adhered to the lower polarizing plate 12 was decreased from the value for the parallel arrangement of the lower polarizing plate 12 and the upper polarizing plate 11 by approximately 5% due to the absorption by the dye. If the decrease in the parallel transmittance is 5% or smaller, there is little influence to the white display, and hence an increase in power consumption can be prevented.

The alignment control film 22 and the alignment control film 23 are formed on the active matrix substrate 31 and the color filter substrate 32, respectively, in order to align the liquid crystal molecules in a predetermined direction. A polyamic acid containing 1,3-dimethyl-1,2,3,4-cyclobutane-tetracarboxylic dianhydride as an acid dianhydride and m-phenylenediamine as a diamine compound is printed and formed on the surface of the substrate and is irradiated by far infrared rays while being heated at 180° C., as irradiation by polarized ultraviolet light, so that the alignment control film 22 and the alignment control film 23 are formed. As the light source for emitting the polarized ultraviolet light, a high-pressure mercury lamp is used. Through the interference filter, ultraviolet rays in the range of 240 nm or larger and 380 nm or smaller were extracted. Using a pile polarizer made of piled quartz substrates, linearly polarized light having a polarization ratio of approximately 10:1 was obtained and projected with irradiation energy of approximately 5 J/cm$^2$. The alignment direction of the liquid crystal molecules existing on the surfaces of the alignment control film 22 and the alignment control film 23 is the direction orthogonal to the polarization direction of the projected polarized ultraviolet light.

In the liquid crystal display device of this embodiment, the contrast ratio at a polar angle of 45° in each azimuth of $\theta=45°$, $\theta=135°$, $\theta=225°$, and $\theta=315°$ was 160 or larger and 180 or smaller. The chromaticity was evaluated by using the CIE1976UCS chromaticity coordinates at a linear distance $\Delta u'v'$ from the chromaticity coordinates in the front direction. In view of characteristics of a human's sense of vision, the range of $\Delta u'v'$ of 0.15 or smaller is an allowable range, and the range is preferably 0.1 or smaller. The variation $\Delta u'v'$ from the chromaticity coordinates in the front direction was determined with respect to the chromaticity coordinates up to a polar angle of 75° for every azimuth, to be 0.09 at largest in the liquid crystal display device of this embodiment. In addition, also from visual evaluation, the liquid crystal display was obtained, which had little color variation and a substantially left/right symmetry for both light leakage and coloring in a black display. The viewing angle compensation by the complex optically anisotropic layer 10 of this embodiment at a wavelength of 550 nm is indicated on the S1 axis illustrated in FIG. 13. Therefore, the viewing angle compensation effect can be enhanced compared with a third embodiment and a fourth embodiment to be described later.

Comparative Example 1

In contrast with the liquid crystal panel having the structure of the first embodiment, a liquid crystal display device of this comparative example used not the complex optically anisotropic layer 10 but an usual iodine stretching polarizing plate as the lower polarizing plate 12 and the upper polarizing plate 11. As a result, the contrast ratio at a polar angle of 45° was 35 for each azimuth of θ=45°, θ=135°, θ=225°, and θ=315°.

Comparative Example 2

Figure 16:
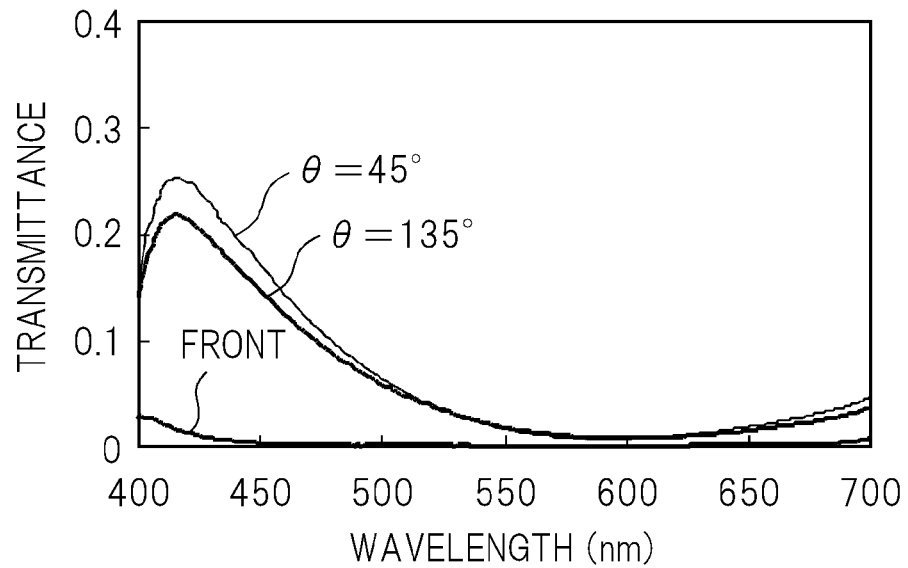
FIG. 16 illustrates the orthogonal spectral transmittance indicating viewing angle compensation characteristics in the case where a biaxial phase difference film is applied as a comparative example.
Figure 17:
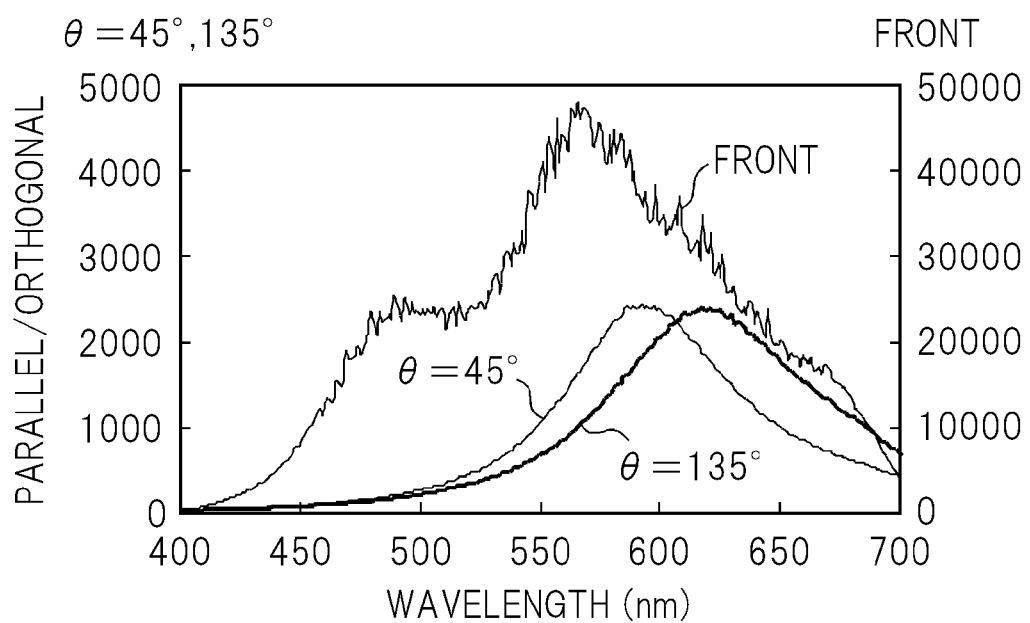
FIG. 17 is a graph indicating the parallel/orthogonal spectral transmittance ratio in the biaxial phase difference film illustrated in FIG. 16.

In contrast with the liquid crystal panel having the structure of the first embodiment, a liquid crystal display device of this comparative example used not the complex optically anisotropic layer 10 but a biaxial phase difference film (pile of an A-plate and a C-plate) so as to compensate for the viewing angle. FIG. 16 illustrates the orthogonal transmittance in the state in which the biaxial phase difference film is adhered to the lower polarizing plate 12, and FIG. 17 illustrates the parallel/orthogonal transmittance ratio. In the off-axis direction at azimuths of 45° and 135°, there is a large light leakage in the range of wavelength of 400 nm or larger and 500 nm or smaller, and the minimum value appears at a wavelength of 580 nm or its vicinity. The light leakage increases again in the range of wavelength of 650 nm or larger. This is the light leakage by chromatic dispersion when the viewing angle compensation is performed by the birefringence phase difference film. Therefore, the light leakage as luminance can be reduced, but the coloring becomes conspicuous.

The variation Δu'v' from the chromaticity coordinates in the front direction was determined with respect to the chromaticity coordinates up to a polar angle of 75° for every azimuth of 45° and 135°, and the largest value thereof in the liquid crystal display device of this comparative example was 0.23. In particular, at a polar angle of 45° or larger in azimuths of θ=45°, θ=135°, θ=225°, and θ=315°, there was a large chromaticity variation so that coloring of magenta was expressed.

Comparative Example 3

A difference between a liquid crystal display device of this comparative example and the liquid crystal display device of the first embodiment is as follows. Polyamic acid varnish was used for printing formation, and was heated at 230° C. for 30 minutes, so as to form the alignment control film 22 and the alignment control film 23 made of fine polyimide of approximately 100 nm. In addition, the alignment control film 22 and the alignment control film 23 were aligned by rubbing or the like. As a result, the pretilt angle of the liquid crystal layer was approximately 2°.

The contrast ratio at a polar angle of 45° in θ=45° and θ=135° was 160, and the contrast ratio in θ=225° and θ=315° was 100. There was a left/right asymmetry.

In the viewing angle characteristics of chromaticity, at the largest value 0.17 of Δu'v', in the left and the right of θ=45°, θ=135°, θ=225°, and θ=315°, color tone is largely different like magenta and cyan color, resulting in a conspicuous left/right asymmetry.

Comparative Example 4

A difference between a liquid crystal display device of this comparative example and the liquid crystal display device of the first embodiment is that only a dichroic dye was used as the viewing angle compensation layer. A dye layer to be a so-called E-type polarizer was disposed between the lower polarizing plate 12 and the liquid crystal cell 15. Thus, the obtained performance of the viewing angle compensation for the contrast ratio and chromaticity was equivalent to that of the first embodiment. However, luminance of a white display was reduced by 30%. In order to set the luminance of a white display to 500 cd/m², the backlight luminance was increased by 30% to be 13,000 cd/m². Therefore, power consumption was increased.

Second Embodiment

In this embodiment, the rubbing treatment was performed on the alignment control film similarly to Comparative Example 3. By setting a rubbing intensity parameter to 360, which was increased from 290 in Comparative Example 3, the pretilt angle of the liquid crystal layer was set to approximately 1°. Note that, the pretilt angle of the liquid crystal layer was set to approximately 1° in this embodiment, but the pretilt angle is desirable to be 1° or smaller. The rubbing intensity parameter Rs is defined by the equation (2).

[Equation 2]

$$R_s = \gamma_r \cdot L \quad (2)$$

where a value of $\gamma_r$ is determined by fiber density and a friction coefficient of the rubbing cloth, and a unique value thereof is used. Here, the value of $\gamma_r$ is handled as a constant. A total rubbing length is denoted by L and expressed by the equation (3).

[Equation 3]

$$L = l\left(1 + \frac{2\pi r n}{60 v}\right) \quad (3)$$

where l is a contact length with the rubbing roller, r is a radius of the rubbing roller, and v is a feed speed of the substrate.

A material for the alignment control film is not particularly limited and may be, for example, a polyimide in which 2,2-bis[4-(p-aminophenoxy)phenylpropane] is used as a diamine and pyromellitic dianhydride is used as an acid anhydride, and a polyimide in which p-phenylenediamine, diaminodiphenylmethane, or the like is used as an amine component, or an aliphatic tetracarboxylic dianhydride, pyromellitic dianhydride, or the like is used as an acid anhydride component. Note that, the carbon number of an alkyl group in the polyimide structure is 2 or smaller. As a branched alkyl group, a polar group such as an amino group or a hydroxyl group is introduced in one of them. By controlling the structure of the polyimide in this way, the pretilt angle may be decreased.

In the liquid crystal display device of this embodiment, the contrast ratio at a polar angle of 45° in each azimuth of θ=45°, θ=135°, θ=225°, and θ=315° was in the range of 140 or larger and 180 or smaller. Because the pretilt angle is larger than that of the liquid crystal display device of the first embodiment, there is a small difference between the left direction and the right direction.

The variation Δu'v' from the chromaticity coordinates in the front direction was determined with respect to the chromaticity coordinates up to a polar angle of 75° for every azimuth, to be 0.13 at largest in the liquid crystal display device of this embodiment. In addition, the color variation by the visual evaluation was larger than the first embodiment and was in the allowable range, though there was a small left/right asymmetry. Here, the allowable range was defined to be the range that the majority of evaluators answered to allow in the visual evaluation with respect to a black display.

Third Embodiment

A difference between a liquid crystal display device of this embodiment and the liquid crystal display device of the first embodiment is that Δnd is 170 nm and the Nz coefficient is 0.45 at a wavelength of 550 nm in the complex optically anisotropic layer 10. In the liquid crystal display device of this embodiment, the contrast ratio at a polar angle of 45° in each azimuth of θ=45°, θ=135°, θ=225°, and θ=315° was in the range of 80 or larger and 95 or smaller.

The variation Δu'v' from the chromaticity coordinates in the front direction was determined with respect to the chromaticity coordinates up to a polar angle of 75° for every azimuth, to be 0.15 at largest in the liquid crystal display device of this embodiment. In addition, the color variation by the visual evaluation was larger than the first embodiment but was in the allowable range.

Fourth Embodiment

A difference between a liquid crystal display device of this embodiment and the liquid crystal display device of the first embodiment is that Δnd is 120 nm and the Nz coefficient is 0.3 at a wavelength of 550 nm in the complex optically anisotropic layer 10. In the liquid crystal display device of this embodiment, the contrast ratio at a polar angle of 45° in each azimuth of θ=45°, θ=135°, θ=225°, and θ=315° was in the range of 90 or larger and 103 or smaller.

The variation Δu'v' from the chromaticity coordinates in the front direction was determined with respect to the chromaticity coordinates up to a polar angle of 75° for every azimuth, to be 0.12 at largest in the liquid crystal display device of this embodiment. In addition, the color variation by the visual evaluation was larger than the first embodiment but was in the allowable range.

Fifth Embodiment

Figure 18:
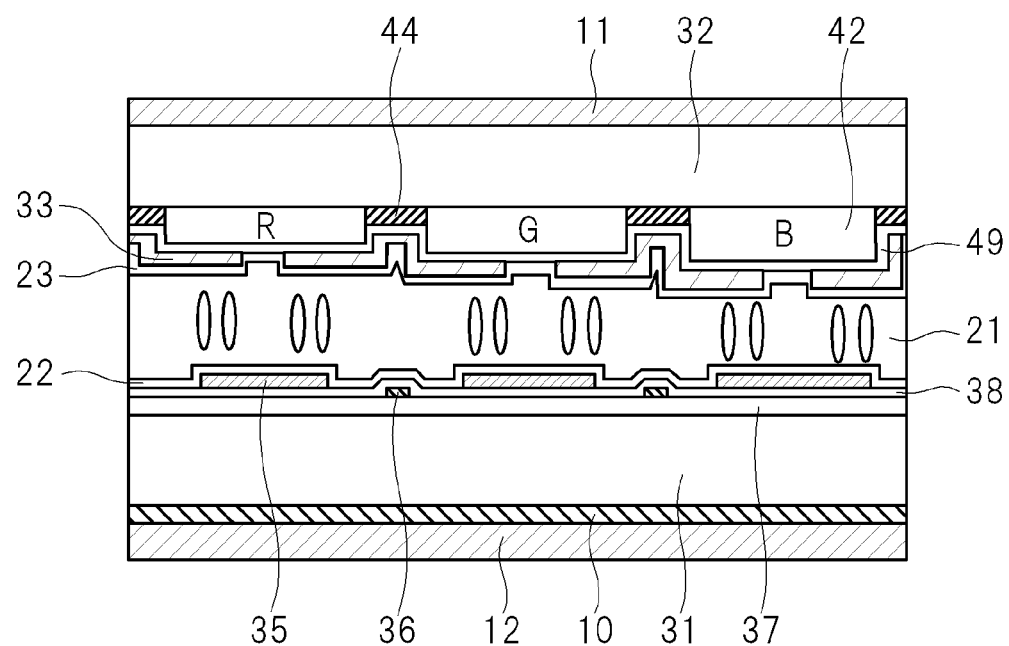
FIG. 18 is a schematic cross sectional view of one pixel and its vicinity in a liquid crystal display device according to a fifth embodiment of the present invention.

In a liquid crystal display device according to this embodiment, a liquid crystal cell for the vertical alignment mode is used as illustrated in FIG. 18. A method of manufacturing the liquid crystal panel of the vertical alignment mode is described briefly as follows. However, it conforms to a typical method and is not limited to the description in this specification.

[Color Filter Substrate]

On the color filter substrate 32 formed from alkali-free glass with a thickness of 0.7 mm, the black matrix 44 was formed by performing continuous sputtering to form a chromium film to have a thickness of 160 nm and a chromium oxide film to have a thickness of 40 nm and by carrying out the steps of the application of a positive resist, pre-baking, exposure, development, etching, peeling, and cleaning. Next, the color filter layer 42 was formed according to a photolithography method, which is a typical method, including the steps of application, pre-baking, exposure, development, rinsing, and post-baking with the use of respective color resists.

Next, a phase difference thin film 49 to be a negative C-plate was formed on the color filter layer 42, which had optically negative uniaxial property, in which the optical axis was substantially vertical to the film surface, and the birefringence phase difference in the thickness direction as the retardation was 205 nm. An example of the phase difference thin film 49 includes the polyimide thin film layer described in Japanese Patent Application Laid-open No. 2008-107766. The negative C-plate performs the viewing angle compensation with respect to the vertical alignment liquid crystal layer. It is preferred that the birefringence phase difference in the thickness direction of the phase difference thin film 49 be in the range of 120 nm or larger and 250 nm or smaller.

Next, vacuum deposition of ITO was performed by sputtering to a thickness of 140 nm and was heated at 240° C. for 90 minutes so as to form a pattern of the common electrode 33 via crystallization, a photo step, and an etching process. Opening portions of the common electrode 33 were sandwiching an opening portion of the pixel electrode 35 at the middle. Next, the columnar spacer 47 (not shown) was formed on the black matrix 44 sandwiched between the blue pixels to a height of approximately 3.5 µm by a photolithography method and an etching method using a photosensitive resin, which is a typical method.

[Active Matrix Substrate]

On the active matrix substrate 31 made of alkali-free glass with a thickness of 0.7 mm, there was formed a scanning electrode 34 (not shown) made of Mo/Al. Here, although not illustrated, a storage capacitor electrode may be formed in the same layer as the scanning electrode 34. In this case, chrome, aluminum, or the like may be used for the storage capacitor electrode. A gate insulating film 37 was formed so as to cover the electrodes, and signal electrodes 36 and thin film transistors (not shown) were formed on the gate insulating film 37. A protective insulating film 38 was formed so as to cover the signal electrodes 36 and the thin film transistors, and the pixel electrode 35 was formed to have an opening pattern on the protective insulating film 38. The pixel electrode 35 may be made of ITO, or a transparent conductor such as zinc oxide or IZO. The pixels are constituted of 1,920×3 (corresponding to R, G, B three primary colors) signal electrodes 36 and 1,080 scanning electrodes 34.

[Liquid Crystal Cell]

The alignment control film 22 and the alignment control film 23 were formed on the active matrix substrate 31 and the color filter substrate 32, respectively. The alignment control film 22 and the alignment control film 23 according to the fifth embodiment have the vertical alignment. A seal agent was applied to the periphery of the active matrix substrate 31, and a liquid crystal material having negative dielectric anisotropy was dropped and sealed by the ODF method, to thereby assemble the liquid crystal panel 120.

The transmission axis of the polarizing layer of the lower polarizing plate 12 was set as the long side direction of the substrate, and the transmission axis of the polarizing layer of the upper polarizing plate 11 was set as the short side direction of the substrate, which were orthogonal to each other. The complex optically anisotropic layer 10 similar to that in the first embodiment was disposed between the lower polarizing plate 12 and the active matrix substrate 31. The liquid crystal molecules in the liquid crystal layer 21 are rotated by the electric field applied between the pixel electrode 35 and the common electrode 33 in the vertical direction.

After that, peripheral circuits, the light source unit 110, and the like were connected to the liquid crystal panel 120, to thereby obtain the liquid crystal display device. A direct type LED was used as the light source unit 110.

Note that, the PVA mode liquid crystal display device using the ITO cut pattern was used in this embodiment. If the MVA method is adopted in which projections are formed on the color filter substrate 32, the process of providing the projections is performed after forming ITO, and then the step of producing the columnar spacer is performed.

In the liquid crystal display device of this embodiment, the complex optically anisotropic layer 10 was used, which had Δnd of 140 nm and the Nz coefficient of 0.3 at a wavelength of 550 nm. The contrast ratio at a polar angle of 45° in each azimuth of θ=45°, θ=135°, θ=225°, and θ=315° was in the range of 100 or larger and 120 or smaller.

The variation Δu'v' from the chromaticity coordinates in the front direction was determined with respect to the chromaticity coordinates up to a polar angle of 75° for every azimuth, to be 0.04 at largest in the liquid crystal display device of this embodiment, which is good characteristics.

Note that, the phase difference thin film may be formed on the active matrix substrate.

In addition, in the liquid crystal display device of this embodiment, the viewing angle compensation layer of the vertical alignment liquid crystal layer was formed on the color filter layer 42, namely in the liquid crystal cell 15, but may be formed between the active matrix substrate 31 or the color filter substrate 32 and the upper polarizing plate 11 or the lower polarizing plate 12. In addition, in this case, the phase difference layer may be piled with the complex optically anisotropic layer 10. In this case, it is more preferred that the complex optically anisotropic layer 10 be outside the negative C-plate, namely between the negative C-plate and the upper polarizing plate 11 or the lower polarizing plate 12.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal panel, comprising:
a first polarizing plate and a second polarizing plate;
a first substrate and a second substrate, which are disposed between the first polarizing plate and the second polarizing plate;
a liquid crystal layer disposed between the first substrate and the second substrate; and
a first optically anisotropic layer disposed between the first polarizing plate and the first substrate, wherein:
the liquid crystal layer includes liquid crystal molecules in horizontal alignment;
the liquid crystal molecules are rotated by an electric field in a direction parallel to an in-plane direction of the first substrate;
when a largest refractive index in a plane of the first optically anisotropic layer is denoted by $n_1x$, a refractive index in a direction orthogonal to a direction of the largest refractive index $n_1x$ is denoted by $n_1y$, and a refractive index in a thickness direction of the first optically anisotropic layer is denoted by $n_1z$, $n_1x \neq n_1y \neq n_1z$ is satisfied;
when a polar angle of the first optically anisotropic layer with respect to an in-plane vertical direction is denoted by $\phi_1$, the first optically anisotropic layer compensates for a polarized state of any light having a wavelength of 530 nm or larger and 560 nm or smaller that enters the first optically anisotropic layer; and
the first optically anisotropic layer has a dichroic maximum value in a range of 430 nm or larger and 470 nm or smaller and has a dichroic maximum value in a range of 600 nm or larger and 650 nm or smaller when $\phi_1 \neq 0$ is satisfied.

2. The liquid crystal panel according to claim 1, wherein when Δn is $(n_1x-n_1y)$, a thickness of the first optically anisotropic layer is denoted by d, and an Nz coefficient is $\{(n_1x-n_1z)/(n_1x-n_1y)\}$, a value of Δn·d is 100 nm or larger and 200 nm or smaller, and a value of the Nz coefficient is 0.2 or larger and 0.5 or smaller.

3. The liquid crystal panel according to claim 2, wherein the value of Δn·d is 120 nm or larger and 150 nm or smaller, and the value of Nz coefficient is 0.3 or larger and 0.4 or smaller.

4. The liquid crystal panel according to claim 1, wherein the first optically anisotropic layer contains a hydrophilic polymer.

5. The liquid crystal panel according to claim 1, wherein the first optically anisotropic layer is adhered to a support film included in the first polarizing plate.

6. The liquid crystal panel according to claim 1, wherein:
the first optically anisotropic layer contains a first dye and a second dye; and
the first dye and the second dye are aligned in the in-plane vertical direction of the first optically anisotropic layer.

7. The liquid crystal panel according to claim 1, wherein the first optically anisotropic layer has a dichroic maximum value in the range of 430 nm or larger and 470 nm or smaller and has a dichroic maximum value in the range of 600 nm or larger and 650 nm or smaller when $43° < \phi_1 < 47°$ is satisfied.

8. The liquid crystal panel according to claim 1, wherein the first optically anisotropic layer is formed through application.

9. The liquid crystal panel according to claim 1, further comprising a second optically anisotropic layer formed between the second polarizing plate and the second substrate, wherein:
when a largest refractive index in a plane of the second optically anisotropic layer is denoted by $n_2x$, a refractive index in a direction orthogonal to a direction of the largest refractive index $n_2x$ is denoted by $n_2y$, and a refractive index in a thickness direction of the second optically anisotropic layer is denoted by $n_2z$, $n_2x \neq n_2y \neq n_2z$ is satisfied;
when a polar angle of the second optically anisotropic layer with respect to an in-plane vertical direction is denoted by $\phi_2$, the second optically anisotropic layer compensates for a polarized state of light having a wavelength of 550 nm that enters the second optically anisotropic layer; and
the second optically anisotropic layer has a dichroic maximum value in a range of 430 nm or larger and 470 nm or smaller and has a dichroic maximum value in a range of 600 nm or larger and 650 nm or smaller when $\phi_2 \neq 0$ is satisfied.

10. The liquid crystal panel according to claim 1, wherein:
the first optically anisotropic layer contains a first dye and a second dye; and
a sum of density of the first dye and density of the second dye with respect to the first optically anisotropic layer is in a range of 0.1 wt % or larger and 5 wt % or smaller.

11. The liquid crystal panel according to claim 1, wherein a pretilt angle of the liquid crystal molecules is 1° or smaller.

12. A liquid crystal display device, comprising:
the liquid crystal panel according to claim 1; and
a light source unit that emits light to the liquid crystal panel.

13. A liquid crystal panel, comprising:
a first polarizing plate and a second polarizing plate;
a first substrate and a second substrate, which are disposed between the first polarizing plate and the second polarizing plate;
a liquid crystal layer disposed between the first substrate and the second substrate;
a phase difference film disposed between one of the first substrate and the liquid crystal layer and between the first substrate and the first polarizing plate; and an optically anisotropic layer disposed between the first polarizing plate and the first substrate, wherein:

the phase difference film has an optically negative uniaxial property;

an optical axis of the phase difference film is perpendicular to an in-plane direction of the phase difference film;

a birefringence phase difference in a thickness direction of the phase difference film is 120 nm or larger and 250 nm or smaller;

the liquid crystal layer includes liquid crystal molecules rotated by an electric field applied between the first substrate and the second substrate in a perpendicular direction;

when a largest refractive index in a plane of the optically anisotropic layer is denoted by nx, a refractive index in a direction orthogonal to a direction having the largest refractive index in the plane of the optically anisotropic layer is denoted by ny, and a refractive index in the thickness direction of the optically anisotropic layer is denoted by nz, nx≠ny≠nz is satisfied;

when Δn is (nx−ny), a thickness of the optically anisotropic layer is denoted by d, and an Nz coefficient is {(nx−nz)/(nx−ny)}, a value of Δn·d is 100 nm or larger and 200 nm or smaller, and a value of the Nz coefficient is 0.2 or larger and 0.5 or smaller;

the optically anisotropic layer contains a first dye and a second dye; and when a polar angle of the optically anisotropic layer with respect to a vertical direction is denoted by ϕ, the first dye has a dichroic maximum value in a range of 430 nm or larger and 470 nm or smaller when ϕ≠0 is satisfied, and the second dye has a dichroic maximum value in a range of 600 nm or larger and 650 nm or smaller when ϕ≠0 is satisfied.

14. The liquid crystal panel according to claim 13, wherein the optically anisotropic layer is disposed between the phase difference film and the first polarizing plate.

15. A liquid crystal display device, comprising:

the liquid crystal panel according to claim 13; and a light source unit that emits light to the liquid crystal panel.

* * * * *